(12) United States Patent
Breeden, III et al.

(10) Patent No.: US 9,242,522 B2
(45) Date of Patent: Jan. 26, 2016

(54) COUPLER LOCK

(71) Applicant: WINSTON PRODUCTS LLC, Cleveland, OH (US)

(72) Inventors: Winston Breeden, III, Chagrin Falls, OH (US); Thaddeus T. Brej, Rocky River, OH (US); David Edward Birn Rathman, Cleveland, OH (US)

(73) Assignee: WINSTON PRODUCTS LLC, Cleveland ( * ) Notice: Subject to any disclaimer, the term of this patent is extended or adjusted under 35 U.S.C. 154(b) by 0 days.

(21) Appl. No.: 14/505,714

(22) Filed: Oct. 3, 2014

(65) Prior Publication Data

US 2015/0097356 A1 Apr. 9, 2015

Related U.S. Application Data (60) Provisional application No. 61/886,138, filed on Oct. 3, 2013.

(51) Int. Cl.
*B60R 25/00* (2013.01)
*B60D 1/60* (2006.01)
*B60D 1/06* (2006.01)

(52) U.S. Cl.
CPC ... *B60D 1/60* (2013.01); *B60D 1/06* (2013.01)

(58) Field of Classification Search
CPC ..................................... B60D 1/60; B60D 1/06
USPC ........................................................ 280/507
See application file for complete search history.

(56) References Cited

U.S. PATENT DOCUMENTS

| | | | |
|---|---|---|---|
| 6,666,051 B1 * | 12/2003 | Li | 70/14 |
| 6,694,781 B1 * | 2/2004 | Li | 70/14 |
| 6,722,686 B2 | 4/2004 | Koy | |
| 7,661,694 B2 * | 2/2010 | Krespach et al. | 280/511 |
| 8,266,933 B2 * | 9/2012 | Bishir et al. | 70/58 |
| 2003/0205884 A1 * | 11/2003 | Koy | 280/507 |
| 2004/0134242 A1 * | 7/2004 | Wyers | 70/14 |
| 2004/0195804 A1 * | 10/2004 | Milazzo | 280/511 |
| 2005/0039498 A1 | 2/2005 | Budge | |

* cited by examiner

*Primary Examiner* — Tony Winner
(74) *Attorney, Agent, or Firm* — Cooper Group LLC (57) ABSTRACT

A coupler lock for attaching to a trailer hitch coupler. The hitch coupler has a socket. The coupler lock includes a locking bar and a plug member for receipt within the socket of the hitch coupler and supported by the locking bar. The coupler lock includes a base structure removably attached to the locking bar. The base structure includes a locking structure actuatable to lockingly retain the base structure attached to the locking bar so as to retain the plug member within the socket of the hitch coupler. The locking structure is positioned above the plug member with the base structure attached to the locking bar and the plug member retained within the socket of the hitch coupler.

8 Claims, 5 Drawing Sheets

COUPLER LOCK

CROSS REFERENCE TO RELATED APPLICATIONS

This application claims the benefit of U.S. Provisional Application No. 61/886,138, filed on Oct. 3, 2013, the entire disclosure of which is hereby incorporated herein by reference.

TECHNICAL FIELD

The instant application is generally directed towards locking devices for trailer hitch couplers, which are also called hitch couplers, to deter the unauthorized towing of a trailer to which the hitch coupler is attached.

BACKGROUND

Trailer hitches exist for a variety of trailers (e.g., boat trailers, car trailers, campers, and the like). Each trailer hitch includes a hitch coupler that has a socket for engaging a hitch ball secured to a towing vehicle. It is possible for an unauthorized person to connect a towing vehicle to an unattended and unattached trailer and tow the trailer away with any associated cargo it may carry. In particular, such may allow for theft of the trailer and/or cargo. As such, there is a continued need to protect unattended and unattached trailers.

Several devices exist to prevent or deter the movement/theft of unattended and unattached trailers. For example, some devices secure a blocking plug within the socket of the coupler of a trailer so as to block/prevent unauthorized engagement of a hitch ball into the socket. Thus, the unauthorized person, possibly a potential thief, is prevented from securing the ball within the coupler and is thus prevented from properly connecting the vehicle to the trailer, and possibly thwarted in an attempted theft.

It is to be noted that for such a movement/theft preventing/deterring device to provide such function, the device need to be used upon trailers. The present inventors have realized that ease of use and operation will help facilitate such use. Also, the present inventors have realized that such devices need to have a structure so that impediment/deterioration from elements, grease, dirt, etc. is avoided, so that the devices remain functional and that use of such devices continue to be favorably considered by users (e.g., trailer owners).

SUMMARY

The following summary presents a simplified summary in order to provide a basic understanding of some aspects of the arrangements and/or methods discussed herein. This summary is not an extensive overview of the arrangements and/or methods discussed herein. It is not intended to identify key/critical elements or to delineate the scope of such arrangements and/or methods. Its sole purpose is to present some concepts in a simplified form as a prelude to the more detailed description that is presented later.

In accordance with one aspect, the present invention provides a coupler lock for attaching to a trailer hitch coupler. The hitch coupler has a socket. The coupler lock includes a locking bar and a plug member for receipt within the socket of the hitch coupler and supported by the locking bar. The coupler lock includes a base structure removably attached to the locking bar. The base structure includes a locking structure actuatable to lockingly retain the base structure attached to the locking bar so as to retain the plug member within the socket of the hitch coupler. The locking structure is positioned above the plug member with the base structure attached to the locking bar and the plug member retained within the socket of the hitch coupler.

DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in schematic and/or block diagram form in order to facilitate describing the claimed subject matter. Relative size, orientation, etc. of parts, components, etc. may differ from that which is illustrated while not falling outside of the scope of the claimed subject matter.

Figure 1:
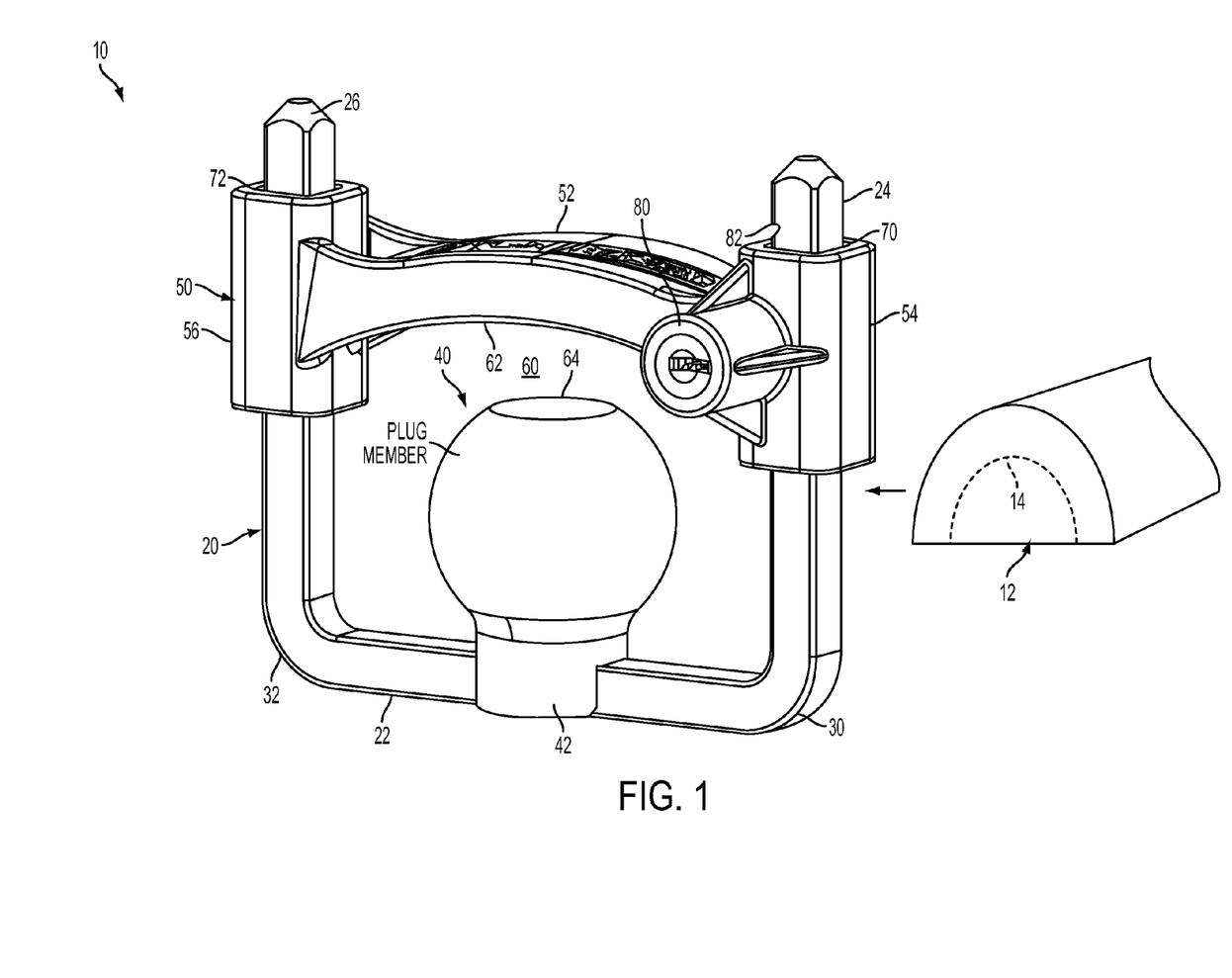
FIG. 1 is a perspective view of an example coupler lock and a schematic representation of a trailer hitch coupler.

FIG. 1 illustrates an example coupler lock 10 in accordance with at least one aspect of the present invention. The coupler lock 10 is for attaching to a trailer hitch coupler 12, schematically shown, that is located on a trailer (not shown). In use, the trailer hitch coupler 12 and the coupler lock 10 are engaged together (as is represented by the schematic arrowhead in FIG. 1). For better viewing of the coupler lock 10, the trailer hitch coupler 12 and the coupler lock are shown separated in FIG. 1.

The trailer hitch coupler 12 may be an integral part of the trailer. The trailer may be of various constructions and/or configurations. For example, the trailer may be a boat trailer, a car trailer, a camper, or the like. The details of the hitch coupler 12 and/or the trailer can be varied. However, the hitch coupler 12 has a socket 14 (shown schematically and via hidden lines) for receiving/engaging a hitch ball (not shown) secured to a towing vehicle (not shown). The socket 14 of the hitch coupler 12 opens or faces downward (i.e., toward ground, pavement or the like).

The coupler lock 10 is for helping to prevent an unauthorized person from connecting a towing vehicle (not shown) to the hitch coupler 12 of the trailer. Specifically, the coupler lock 10 helps to block/prevent unauthorized engagement of an unauthorized hitch ball (not shown) into the socket 14. Thus, the coupler lock 10 can help prevent unauthorized towing of the trailer and any associated cargo it may carry. In particular, such may help prevent theft of the trailer and/or cargo.

The example coupler lock 10 includes a locking bar 20. Within the shown example, the locking bar 20 defines an elongate, extending structure. In the example, the locking bar 20 includes a central portion 22 between a first locking end 24 and an opposed, second locking end 26. The locking bar 20 can be provided in any number of sizes, shapes, and configurations. In the illustrated example, the locking bar 20 includes a plurality of bends 30, 32, such that the locking bar is generally non-linear. For example, the central portion 22 extends horizontally and the first and second locking ends extend vertically, as shown within FIGS. 2 and 3. Also for example, the locking bar 20 includes a first bend 30 (e.g., at a right angle), between the first locking end 24 and the central portion 22. Further as an example, the locking bar 20 includes a second bend 32 (e.g., right angle), between the second locking end 26 and the central portion 22. In the illustrated example, the locking bar 20 is generally U-shaped, though other shapes are envisioned. The locking bar 20 may be made of any number of materials, such as metals (e.g., steel, aluminum, titanium, etc.), composite materials, plastics (e.g., hardened and/or tamper resistant) or the like.

The locking bar 20 may have any number of cross-sectional shapes. In some examples, the locking bar 20 includes a quadrilateral cross-sectional shape, such as a square cross-sectional shape (as illustrated), rectangular cross-sectional shape, etc. The locking bar 20 is not so limited, however, and in other examples, may include rounded cross-sectional shapes (e.g., circular cross-sectional shapes, oval cross-sectional shapes, etc.), or the like.

Figure 2:
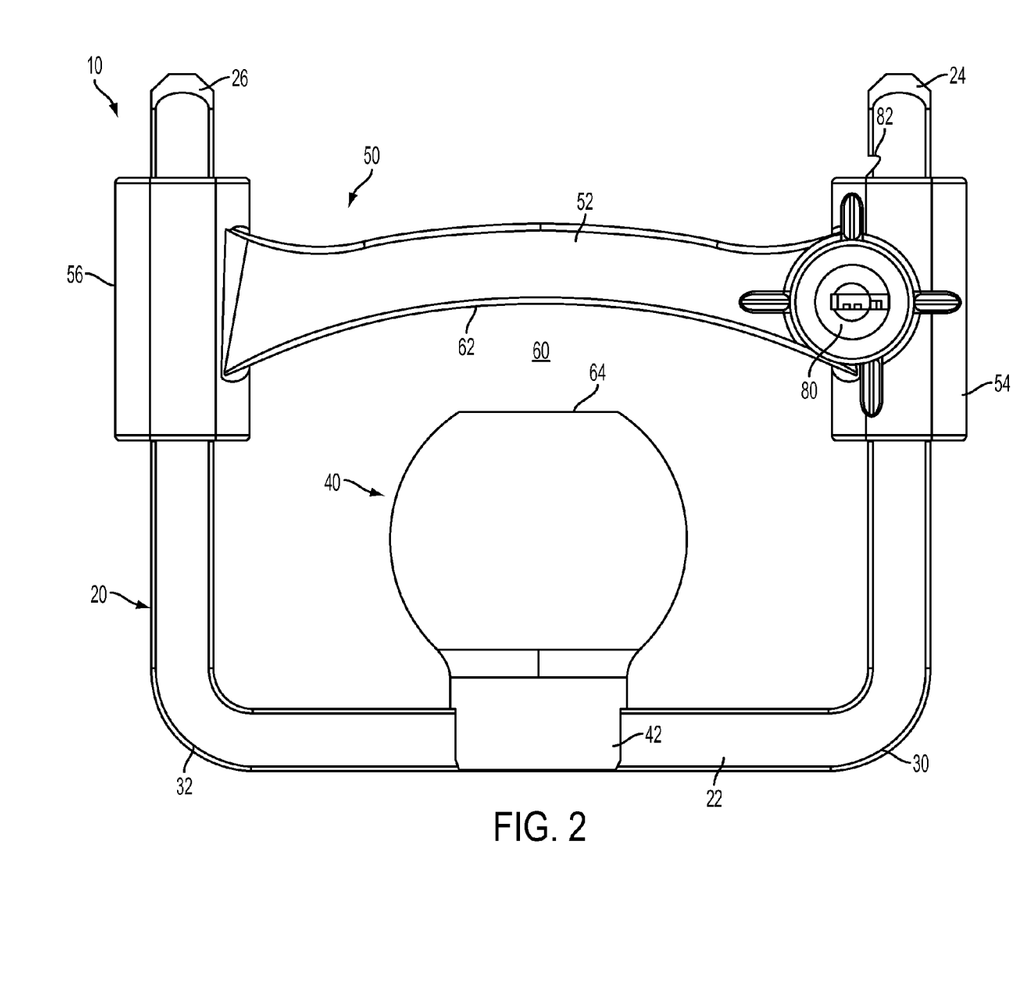
FIG. 2 is a front view of the example coupler lock of FIG. 1.

A plug member 40 is supported on the locking bar 20 (FIGS. 1 and 2). The plug member 40 is for receipt within the socket 14 of the hitch coupler 12. The plug member 40 is generally retained upon the locking bar 20 such that the plug member 40 cannot be separated from the locking bar when the coupler lock 10 is attached to the hitch coupler 12. For example the plug member 40 may be permanently attached (e.g., via welding) to the locking bar 20. Such would prevent removal of the plug member 40 from the locking bar 20 at all times. As another option, the plug member 40 may be secured via inter-fitting parts, such as legs 42 (FIGS. 1 and 4) of the plug member that straddle the locking bar 20. As yet another option minimally accessible (e.g., only accessible when the plug member 40 is not located within the socket 12 of the hitch coupler 12) fasteners (not shown) could be provided to removably attach the plug member to the locking bar 20, etc. Also, it is contemplated that the plug member 40 may be permitted to have some limited movement relative to the locking bar 20 and thus the socket 14 of the hitch coupler 12. One example of such limited movement may include linear movement along the central portion 22 of the locking bar 20 so as to allow for better alignment within the socket 14 of the hitch coupler 12 and/or deter unauthorized tampering. Another example of such limited movement may include rotational movement of at least part of the plug member 40 to as to so as to allow for better alignment within the socket 14 of the hitch coupler 12 and/or deter unauthorized tampering. Still further, it is possible that the plug member 40 is held in place (e.g., in the supported position) via a fastener 44 (see FIG. 3) extending between the plug member and the locking bar 20. Within one specific example such fastener 44 is extending through at least one leg 42 of the plug member and into the central portion 22 of the locking bar 20 (as shown within the example). Such details need not be specific limitations.

Within the shown example, the plug member 40 is disposed between the first locking end 24 and the second locking end 26 at the central portion 22 of the locking bar 20 (FIGS. 1 and 2). The plug member 40 can be provided in any number of sizes, shapes, and constructions. The plug member 40 may be made of any number of materials, such as metals (e.g., steel, aluminum, titanium, etc.), composite materials, plastics (e.g., hardened and/or tamper resistant) or the like.

In some examples, such as the shown example, the plug member 40 has a generally spherical/rounded exterior shape that generally corresponds to a generally spherical/rounded interior shape of the socket 14 of the hitch coupler 12. A diameter of the spherical/rounded exterior shape of the plug member 40 may generally correspond to a diameter of the spherical/rounded interior shape of the socket 14 of the hitch coupler 12. Such spherical/rounded interior shape of the socket 14 of the hitch coupler generally corresponds to a specific hitch ball size (e.g., 1⅞ inch diameter, 2 inch diameter, 2 5/16 inch diameter) that may be mounted upon a tow vehicle (not shown). In other examples, any number of sizes (e.g., diameters) are envisioned. However, the plug member 40 need not be round/spherical, and even if round/spherical there need not be a specific relationship of diameters. It is to be appreciated that the plug member 40 could be removed from the locking bar 20 at an appropriate time (e.g., when the coupler lock 10 is not attached to the hitch coupler 12 and the plug member is not within the socket 14 of the hitch coupler). As such, in some examples, the plug member 40 is removable from the locking bar 20, such that the coupler lock 10 can accommodate a number of different sizes of the plug member 40. With each different sized plug member 40 on the locking bar 20, the plug member is of course prevented from being completely removed from the locking bar when the coupler lock 10 is attached to the hitch coupler 12 and the plug member is within the socket 14 of the hitch coupler. So in general, the plug member 40 can be considered to have a first configuration, and the plug member is removable and replaceable with a different plug member of a second, different configuration.

Figure 5:
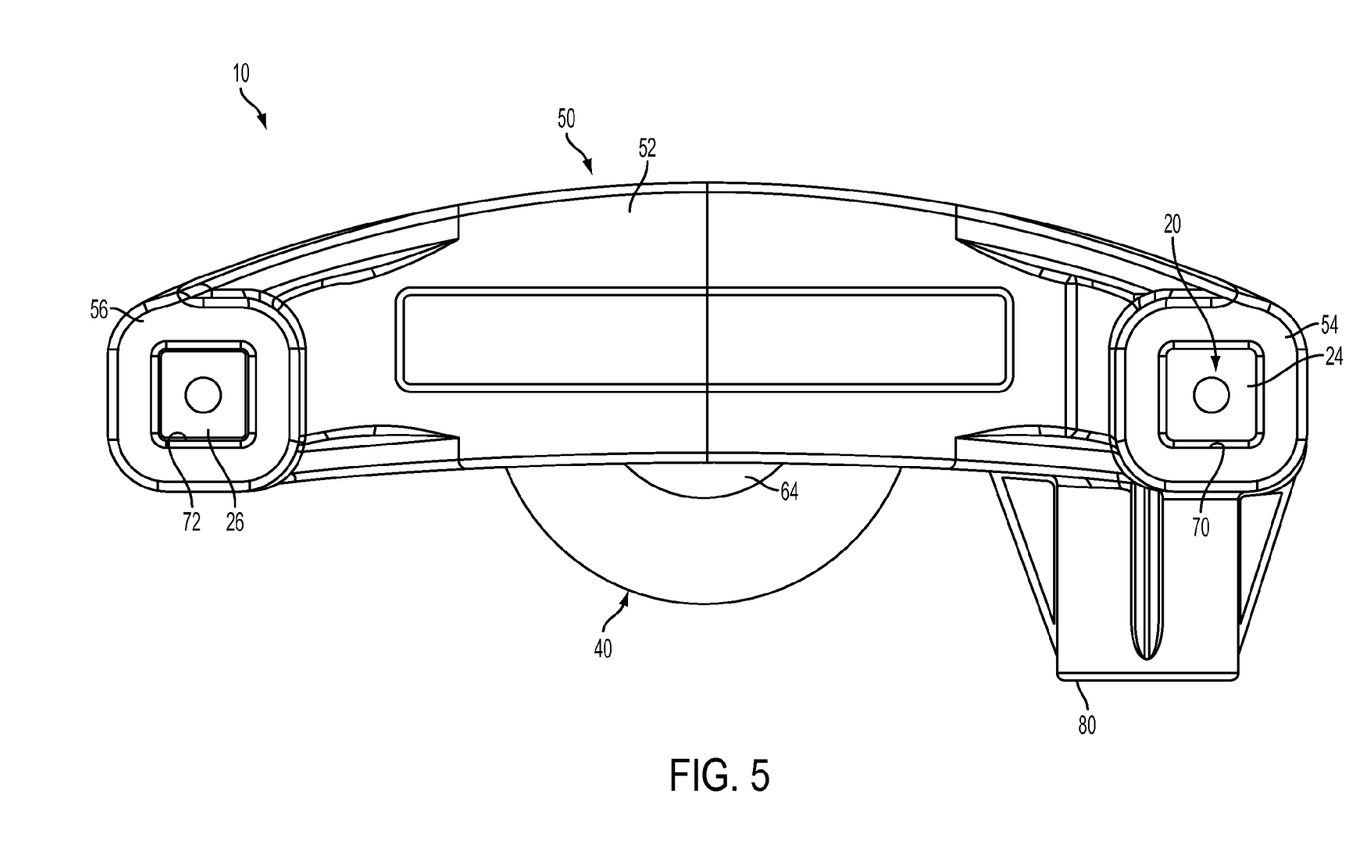
FIG. 5 is a top view of the example coupler lock of FIG. 1.

With the shown example, the coupler lock 10 includes a base structure 50 that is removably attached to the locking bar 20 (FIGS. 1 and 5). The base structure 50 is elongated and includes a central base portion 52, a first receiving end 54, and an opposed, second receiving end 56. The base structure 50 may have a plurality of separate parts, with the separate parts being made of same or different materials. However, all or most of the separate parts may be made of any number of materials, such as metals (e.g., steel, aluminum, titanium, etc.), composite materials, plastics (e.g., hardened and/or tamper resistant) or the like. Within the shown example, the central base portion 52 is upwardly, curved or ached. The central base portion 52 may be non-curved, non-arched. Also, the central base portion 52 may have various sub-structures, such as strengthening ribs, indicia, etc. Such need not be specific limitations.

In use (i.e., the coupler lock 10 being on the hitch coupler 12), the base structure 50 is generally above the hitch coupler. The base structure 50, in cooperation with the locking bar 20, defines a gap, space, etc. 60, positioned between a bottom surface 62 of the central base portion 52 of the base structure 50 and a top surface 64 of the plug member 40. As such, the base structure 50 allows for the hitch coupler 12 to receive the plug member 40 (e.g., by the hitch coupler 12 being placed over the plug member such that the plug member is within the socket 14 of the hitch coupler), with the base structure limiting the hitch coupler from becoming inadvertently disengaged from the plug member. In other words, the hitch coupler 12 is entrapped within the gap/space 60 defined by the base structure 50 and plug member 40, with the plug member within the socket 14 of the hitch coupler 12. The central portion 22 of the locking bar 20 is generally below the hitch coupler 12, with the first and second locking ends 24, 26 extending vertically on each respective lateral side of the hitch coupler 12 to the area above the hitch coupler (i.e., the area above the hitch coupler is the location of the base structure 50). It is to be again appreciated, with the plug member 40 being within the socket 14 of the hitch coupler 12, a hitch ball (not shown) cannot be inserted into the socket 14 and thus the trailer cannot be properly towed via the hitch ball not being within the socket.

The base structure 50 can include a first aperture 70 (FIGS. 1 and 3) at the first receiving end 54 and a second aperture 72 at the second receiving end 56. The first aperture 70 and second aperture 72 each define an opening, recess, or the like that extends into/through the base structure 50. The show example has apertures 70, 72 that extend completely through the base structure 50 and thus the apertures 70, 72 could be considered to be through-openings. However, as mentioned, the apertures 70, 72 could be recesses and thus could be considered to be blind-holes. During use, the first and second locking ends 24, 26 of the locking bar extend into the first and second apertures 70, 72, respectively.

Within the shown example, the first aperture 70 and second aperture 72 extend, along their though axes, generally parallel with respect to each other. In an example, the first aperture 70 and second aperture 72 are spaced apart a first distance that substantially matches a second, corresponding distance between the first locking end 24 and second locking end 26 of the locking bar 20. The first aperture 70 and second aperture 72 include any number of sizes and shapes, such as a quadrilateral cross-sectional shape (as illustrated), a circular cross-sectional shape, etc. In at least one example, the first aperture 70 and second aperture 72 have a cross-sectional shape that substantially matches the cross-sectional shape of the first locking end 24 and the second locking end 26, respectively. In addition, the first aperture 70 can be slightly larger in cross-sectional size than the first locking end 24, such that the first aperture can receive the first locking end. Also, the second aperture 72 can be slightly larger in cross-sectional size than the second locking end 26, such that the second aperture can receive the second locking end.

The base structure 50 includes a locking structure 80 actuatable to lockingly retain the base structure 50 attached to the locking bar 20 so as to retain the plug member 40 within the socket 14 of the hitch coupler 12. The locking structure 80 includes any number of structures, such as a key-actuated lock mechanism (shown within the example), combination code actuated, RFID actuated, one or more springs, one or more bolts, etc., such that the locking structure can be selectively locked and unlocked. As can be appreciated, various locking structures are contemplated. Such details need not be specific limitations.

Within one example (shown) that includes a key-actuated mechanism, the locking and unlocking can be termed as key-actuation (e.g., key-actuated locking and key-actuated unlocking). In an example (shown), the locking structure 80 is positioned adjacent the first receiving end 54 of the base structure 50. As such, the locking structure 80 can lock the first receiving end 54 with respect to the first locking end 24. In other examples, however, the locking structure is not limited to such a position, and, instead, may be positioned along the central base portion 52, closer to the second receiving end 56, etc. Also, in another example, the locking structure 80 can be such that the locking structure can be at/near the second receiving end 56 for locking the second receiving end with respect to the second locking end 26. Still in a further example, the locking structure may be such to lock both the first receiving end 54 with respect to the first locking end 24 and the second receiving end 56 with respect to the second locking end 26. It is to be appreciated that for all of the possible examples, the first and/or second locking ends 24, 26 have one or more structures (e.g., 82, see FIG. 3) that can be engaged by at least a portion (e.g., 84) of the locking structure 80 for locking.

Within one example (shown), the first locking end 24 has structures 82 that are teeth 82, which can be engaged. Also within the one example (shown), the portion 84 of the locking structure 80 is a movable bolt 84 of the locking structure. It is the bolt 84 that can be moved to engage the teeth 82 for locking. It is to be further appreciated that upon locking, the base structure 50 is prevented from moving relative to the locking bar 20. In particular, the teeth 82 are arranged (e.g., with slope and face surfaces) to prevent the bolt 84, and thus the entire base structure 50, from moving vertically and especially upwardly relative to the locking bar 20. As such, the first and second locking ends 24, 26 of the locking bar 20 are entrapped within the respective first and second receiving ends 54, 56. With the plug member 40 located within the socket 14 of the hitch coupler 12, the plug member provides the desired blocking function (i.e., prevention of insertion of a hitch ball into the socket of the hitch coupler).

It is to be noted that the base structure 50 and the included locking structure 80 are located above (i.e., vertically higher) the central portion 22 of the locking bar 20. Also, the base structure 50 and, specifically, the included locking structure 80 are located above (i.e., vertically higher) the plug member 40. Still further, the base structure 50 and, specifically, the included locking structure 80 are located generally above (i.e., vertically higher) the hitch coupler 12 when the coupler lock 10 is secured onto the hitch coupler. Specifically, the locking structure 80 is positioned above the plug member 40 with the base structure 50 attached to the locking bar 20 and the plug member 40 retained within the socket 14 of the hitch coupler 12. It should be appreciated that some portions of the coupler lock 10 could be at a contemporaneous level with the hitch coupler 12. However, the aspect to appreciate is that the locking structure 80 is at a generally high position in relation to the hitch coupler 12.

During operation of the shown example (i.e., the locking structure 80 positioned adjacent the first receiving end 54 of the base structure 50), in one possible specific example, the locking structure 80 is actuatable/movable between an unlocked position and a locked position. In the unlocked position, the locking structure 80 (e.g., the bolt 84) does not engage the first locking end 24 (e.g., the teeth 82), such that the base structure 50 is movable with respect to and/or removable from the locking bar 20. In the locked position (FIG. 3), the locking structure 80 (e.g., the bolt 84) can engage the first locking end 24 (e.g., teeth 82) of the locking bar 20, such that the base structure 50 is generally immovable and/or not removable from the locking bar. In this locked position, the base structure 50 can secure the hitch coupler 12 to the plug member 40. Of course, the hitch coupler 12 is accordingly removable when the locking structure 80 is in the unlocked position.

Figure 3:
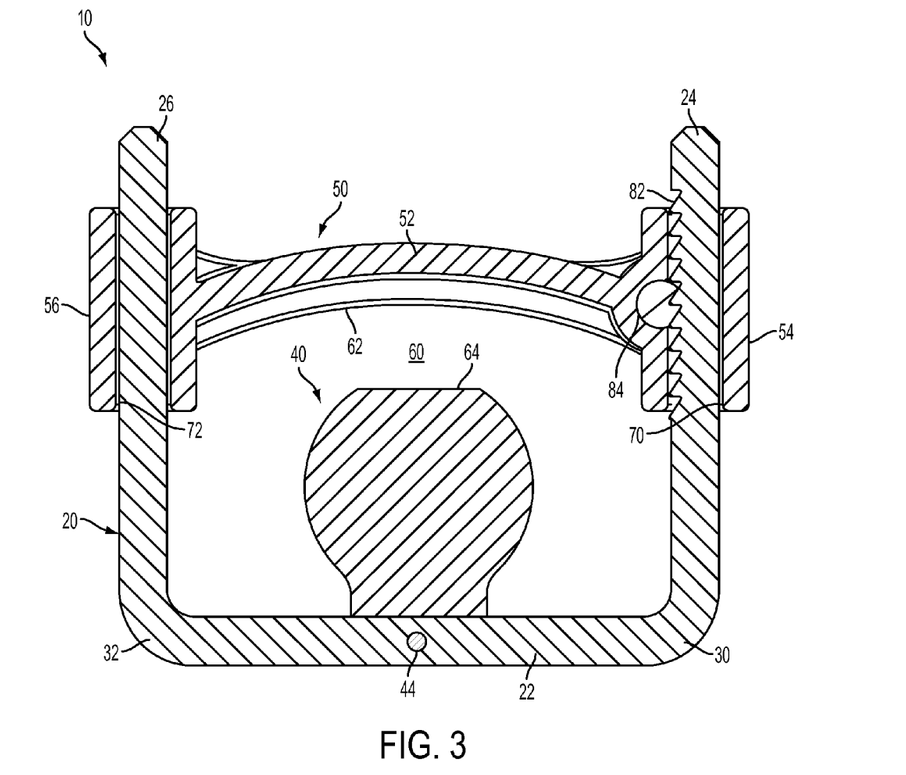
FIG. 3 is a view similar to FIG. 2, but is a section view of some portions of the example coupler lock.
Figure 4:
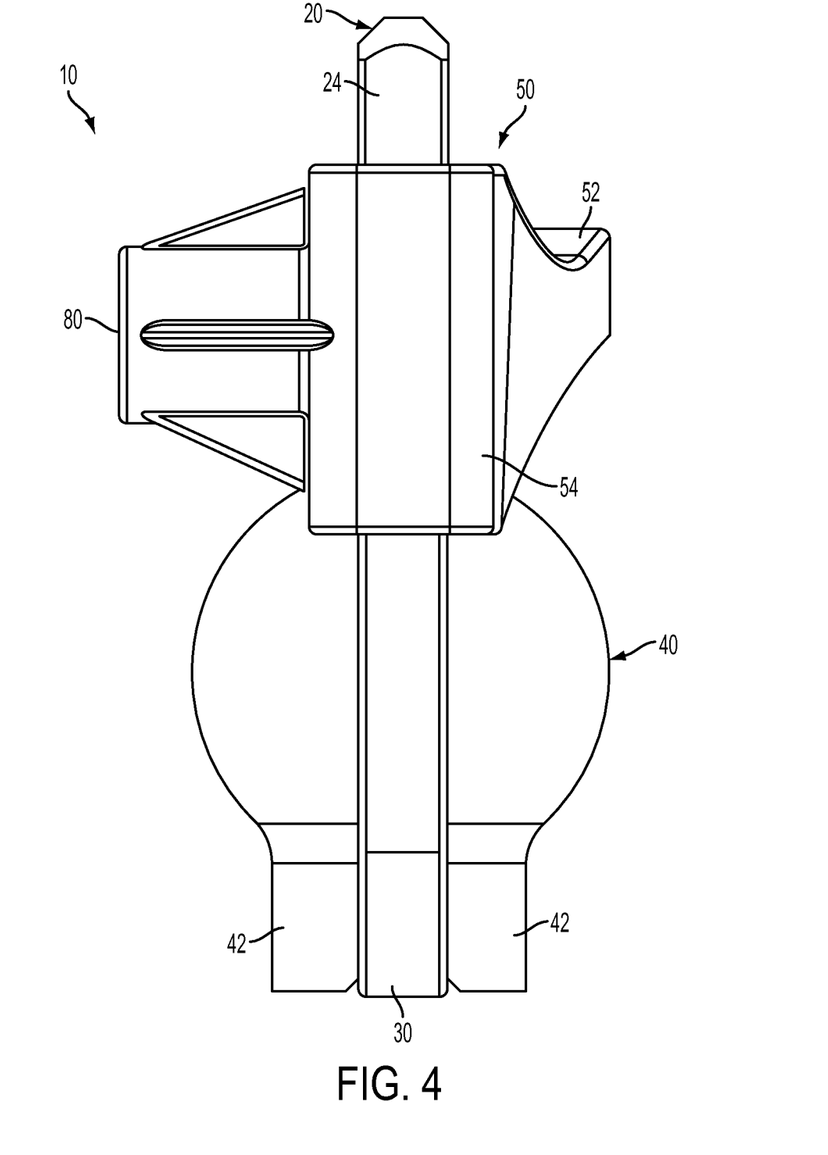
FIG. 4 is a side view of the example coupler lock of FIG. 1.

As mentioned, in one possible example, as illustrated in FIG. 3, the first locking end 24 may include one or more teeth 82 as structure that can be engaged by at least a portion of the locking structure 80. The teeth 82 define a non-planar surface area of the first locking end 24 and extend at least partially along a length of the first locking end. The teeth 82 are sized/shaped to mate with and engage a bolt 84 of the locking structure 80 when the locking structure is in the locked position. For example, when the locking structure 80 is in the unlocked position, the bolt 84 may not engage the teeth 82, such that the base structure 50 is freely removable from the locking bar 20. In another example, when the locking structure 80 is in the locked position, the bolt 84 can engage the teeth 82, as illustrated in FIG. 3. Upon engaging the teeth 82, the bolt 84 of the locking structure 80 can generally limit movement of the base structure 50 with respect to the locking bar 20.

It is to be appreciated that with the unique design and construction of the coupler lock 10 several unique advantages are achieved. It is to be appreciated that a person (e.g., a user, such as a trailer owner) who would utilize the coupler lock 10 is typically positioned so as to be viewing the coupler lock from above. Specifically, "above" is to be taken as generally vertically higher than the hitch coupler 12 and the coupler lock 10. Also, it is to be appreciated that the person who would utilize the coupler lock 10 is typically positioned so as to be handling the coupler lock from above. This is not so say that a person could not view/handle the coupler lock 10 from a different position (e.g., below—generally vertically lower than the hitch coupler 12 and the coupler lock) if the person so desired.

It is to be further appreciated that grease, oil and/or other lubricant is often placed into the socket 14 of the hitch coupler 12, or otherwise is present within the socket (e.g., via transfer from a hitch ball that has been inserted into the socket). Of course, such grease, oil and/or other lubricant is beneficial during a towing operation for the purpose of friction reduction between the hitch ball and the hitch coupler 12. However, the presence of grease, oil and/or other lubricant could become a problem/hindrance against a person's willingness to properly secure against unauthorized connection of a hitch ball into the hitch coupler 12 (e.g., possibly for the purpose of theft by an unauthorized person). However, the coupler lock 10 in accordance with at least one aspect of the present invention addresses such problem/hindrance. Specifically, the locking structure 80 is positioned above the plug member 40 when the base structure 50 is attached to the locking bar 20 and the plug member 40 is retained within the socket 14 of the hitch coupler 12. If gravity acts upon such grease, oil and/or other lubricant, the grease, oil and/or other lubricant cannot flow/fall onto/into the locking structure 80 because the locking structure is above the plug member 40, which is located within the socket 14 of hitch coupler 12.

Also, grease, oil and/or other lubricant tends could attract dirt, dust, etc. If gravity acts upon such dirt, dust, etc., the dirt, dust, etc. cannot fall onto/into the locking structure 80 because the locking structure is above the plug member 40, which is located within the socket 14 of hitch coupler 12.

Still further, as mentioned, the person who would utilize the coupler lock 10 is typically positioned so as to be viewing/handling the coupler lock from above. Such person can remain in such a position (i.e., above) and does not need to reposition (e.g., to lie upon ground) so as to view/handle from below the coupler lock 10. Such, can help avoid the possibility of having grease, oil and/or other lubricant and/or dirt, dust, etc. transfer onto the person. Still further, operation of the locking structure 80, (e.g., via a key) may be easier from above. Even further, such person using the coupler lock 10 is helped to avoid the possibly of reaching blindly below/underneath the hitch coupler 12, which may have grease, oil and/or other lubricant and/or dirt, dust, etc. thereon, for the purpose of actuating the locking structure 80, since the locking structure is located above as presented and discussed herein.

It is to be noted that, "above" is to be taken as generally vertically higher than the hitch coupler and the coupler lock. Also, it is to be appreciated that the person who would utilize the coupler lock is typically positioned so as to be handling the coupler lock from above. This is not so say that a person could not view/handle the coupler lock from a different position (e.g., below—generally vertically lower than the hitch coupler and the coupler lock).

Although the subject matter has been described in language specific to structural features or methodological acts, it is to be understood that the subject matter defined in the appended claims is not necessarily limited to the specific features or acts described above and shown within the drawings. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc.

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A coupler lock for attaching to a trailer hitch coupler, the hitch coupler having a socket, the coupler lock including:
   a locking bar having a general U-shape with first and second vertically extending locking ends, only one of the first and second vertically extending locking ends having teeth;
   a plug member for receipt within the socket of the hitch coupler and supported by the locking bar; and
   a base structure removably attached to the locking bar, the base structure including a curved central base portion and first and second apertures located at opposed ends of the central base portion, a curvature of the central base portion being downwardly concave so as to curve around the trailer hitch coupler, the base structure further including a locking structure located offset from a center of the central base portion and adjacent to the one of the first and second vertically extending locking arms having teeth, the locking structure including a key-actuated lock mechanism that extends horizontally so as to be actuatable and move a portion of the key-actuated lock mechanism into direct engagement within the teeth on the one of the first and second vertically extending locking arms having teeth to lockingly retain the base structure attached to the locking bar so as to retain the plug member within the socket of the hitch coupler, the locking structure being positioned above the plug member with the base structure attached to the locking bar and the plug member retained within the socket of the hitch coupler.

2. A coupler lock as set forth within claim 1, wherein the plug member has a first configuration, the plug member is removable and replaceable with a different plug member of a second, different configuration.

3. A coupler lock as set forth within claim 1, wherein the locking bar includes a central portion upon which the plug member is supported, and the first and second vertically extending locking ends are located at opposed ends of the central portion of the locking bar.

4. A coupler lock as set forth within claim 3, wherein the first and second locking ends of the locking bar extend into the first and second apertures, respectively.

5. A coupler lock as set forth within claim 1, wherein the plug member is removably secured to the locking bar by a fastener extending between a portion of the plug member and a portion of the locking bar.

6. A coupler lock as set forth within claim 1, wherein the plug member includes two legs that straddle the locking bar.

7. A coupler lock as set forth within claim 1, wherein the base structure, with the included locking structure, is generally above the hitch coupler with the base structure attached to the locking bar and the plug member retained within the socket of the hitch coupler.

8. A coupler lock as set forth within claim 1, wherein the plug member is removably supported by the locking bar.

* * * * *